United States Patent

[11] 3,600,811

| [72] | Inventor | Adolf Weyrauch<br>Aalen, Germany |
|---|---|---|
| [21] | Appl. No. | 754,046 |
| [22] | Filed | Aug. 20, 1968 |
| [45] | Patented | Aug. 24, 1971 |
| [73] | Assignee | Carl Zeiss Stiflung, doing business as, Carl Zeiss<br>Heidenheim on the Brenz, Wuerttemberg, Germany |
| [32] | Priority | Aug. 22, 1967 |
| [33] | | Germany |
| [31] | | P 16 23 343.5 |

[54] ARRANGEMENT FOR MEASURING OR ADJUSTING TWO-DIMENSIONAL POSITION COORDINATES
6 Claims, 7 Drawing Figs.

[52] U.S. Cl. .................................................. 33/125 R,
356/169, 33/125 A
[51] Int. Cl. ..................................................... G01b 9/00,
G01d 7/04, G23q 17/00
[50] Field of Search ........................................... 33/125 R,
125 A; 356/169, 170

[56] References Cited
UNITED STATES PATENTS

| 1,974,606 | 9/1934 | Fassin | 33/125 UX |
|---|---|---|---|
| 2,368,434 | 1/1945 | Turrettini | 356/170 |
| 2,412,017 | 12/1946 | Taylor et al | 33/125 UX |
| 2,879,692 | 3/1959 | Turner | 33/125 X |
| 3,449,754 | 6/1969 | Stutz | 33/1 M X |

FOREIGN PATENTS

| 503,069 | 3/1939 | Great Britain | 33/125 |

*Primary Examiner*—Robert B. Hull
*Attorney*—Singer, Stern & Carlberg

ABSTRACT: An arrangement for measuring two-dimensional position coordinates of points on an object. It is provided with two unidimensional scales fixed relative to the base and avoids guiding errors which are apt to occur when the worktable or other slidable support carrying the object is rotated somewhat from slide paths precisely parallel to the scale directions. The scale-reading means are fixedly connected to the slidably mounted object support and the axis of the focusing microscope or other object-point-defining device, such as the axis of a tool, passes through the point of intersection of the axes of said scales.

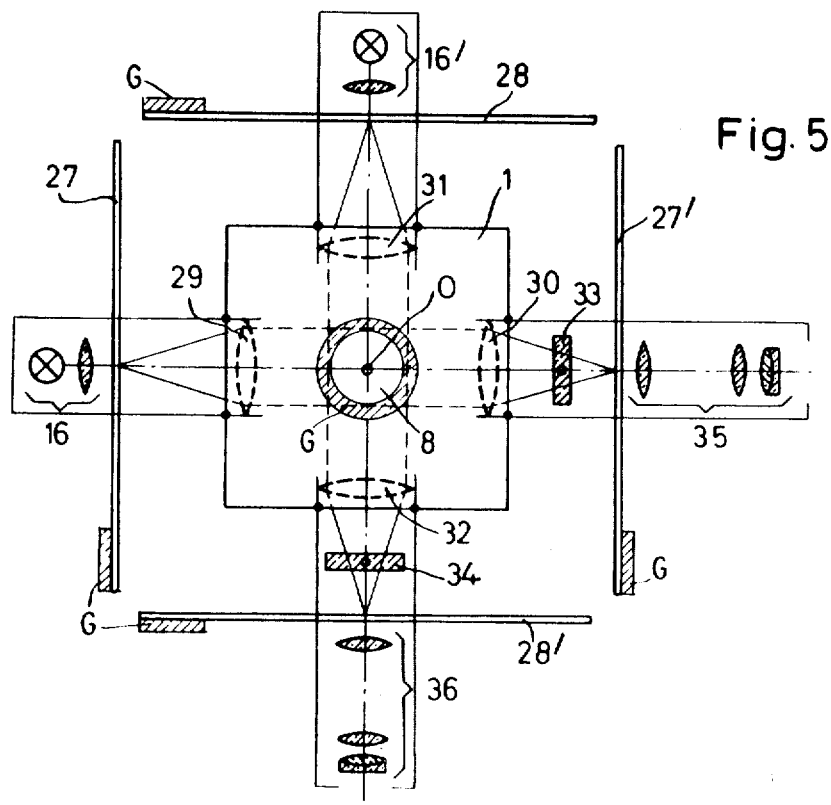
Fig. 5
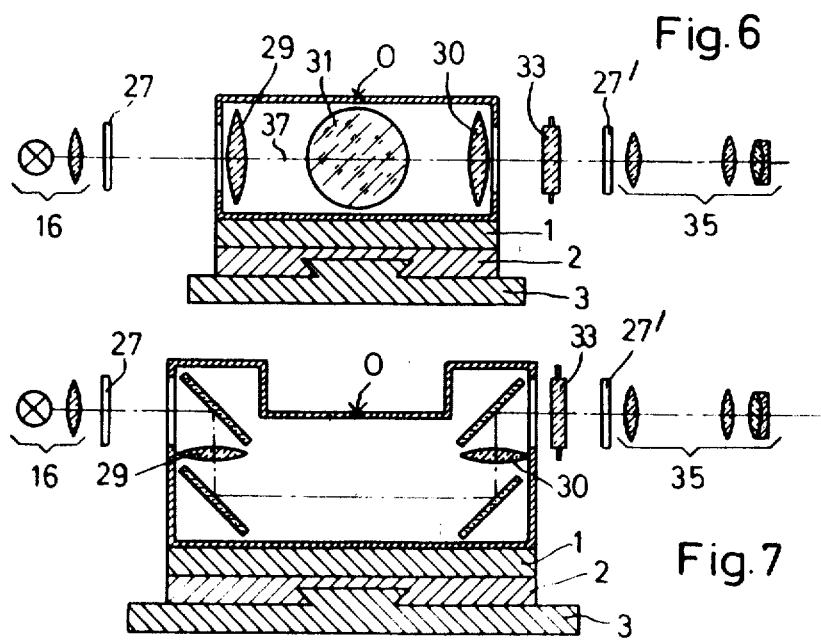
Fig. 6
Fig. 7

ARRANGEMENT FOR MEASURING OR ADJUSTING TWO-DIMENSIONAL POSITION COORDINATES

The present invention relates to an arrangement for measuring or adjusting two-dimensional position coordinates comprising two unidimensional scale embodiments, an object support slidable relatively to the scale embodiments and devices for object and scale detection.

As is well known, in unidimensional measurements the influence of a guiding error may be eliminated by the observance of the comparator principle. Moreover, quite a few different arrangements have become known which, for the unidimensional case, compensate the influence of the guiding error when the comparator principle is violated (compare, for instance, Swiss Pat. No. 381,866).

In a two-dimensional measurement, additional error components are encountered, as compared with the unidimensional measurement. Thus, for instance, a guiding error in the $X$-coordinates influences the measuring accuracy both in the $x$-direction and the $y$-direction. In order to accomplish also in this case a compensation of the guiding error, it is known to employ a single cross grid in place of two scales, that is, instead of two unidimensional scale embodiments one two-dimensional scale embodiment is used as disclosed, for instance, in the English Pat. No. 869,290. The production of cross grids of the type indicated for measuring purposes is extremely difficult and expensive.

It is now an object of the present invention to avoid guiding errors in two unidimensional scale embodiments as they occur upon rotations of the object support relative to the measuring system.

In accordance with the invention, this object is attained in an arrangement of the type as described hereinbefore by fixedly connecting the scale-detecting (reading or index) means with the object support, and wherein the axis of the object-detecting (point-defining) means passes through the point of intersection of the axes of the respective scales.

The invention will be described by way of several examples with reference to the accompanying drawings, in which:

FIG. 5 illustrates in a plan view a further embodiment comprising optical scale-detecting means;

FIG. 6 is a side elevation view of the embodiment illustrated in FIG. 5; and

FIG. 7 illustrates a modification of the embodiment of FIG. 6.

Figures 1, 2:
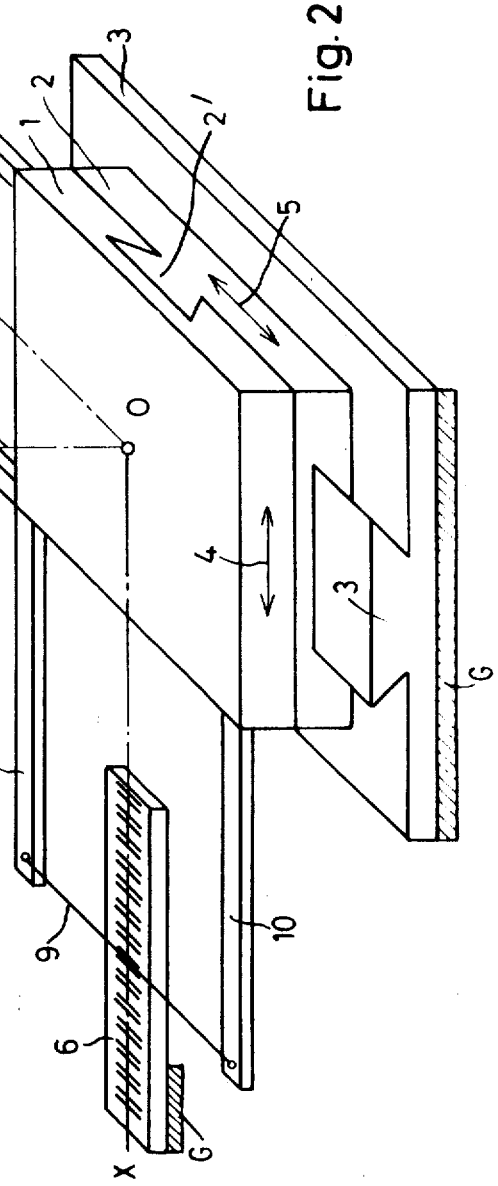
FIG. 1 is a diagrammatic view, showing the operation of an arrangement according to the present invention.
FIG. 2 illustrates in a diagrammatic perspective view an embodiment according to the invention comprising mechanical scale-detecting means.

Referring to FIG. 1, reference numeral 1 designates a tablelike object support in a top plan view which is slidable relative to the coordinate systems $x$, $y$. For point P of the object support 1 the coordinate values $y_1$ and $x_1$, respectively, are determined when being read perpendicularly to the support edges, i.e. in the solid lines position in the direction A–P and B–P, respectively. If now the support 1 has been rotated about the point of intersection O of the stationary coordinate system $x$, $y$ through a small angle $\alpha$ (of the scope $\alpha \dot{=} \sine \alpha$), as shown in dotted lines, then a reading of the coordinates for the displaced point P' (identical with P) in the direction A'–P' and B'–P', respectively, will result in the same coordinate values $x_1$ and $y_1$, respectively, because the directions of reading A–P and A'–P', and B–P and B'–P', respectively, intersect in the same points $x_1$ and $y_1$, respectively, on the coordinate axes to a first approximation.

By making use of these facts, the rotation-insensitive two-coordinate measuring device according to the invention has the following basic design, as illustrated schematically in FIG. 2.

The reference numerals 1, 2 and 3 designate a well known cross-slide system, the upper part 1 of which serves as an object support. By way of example, the object support 1 is slidable in the directions of the arrow 4 and part 2 is slidable in the directions of the arrow 5 on corresponding dovetail guides 2' and 3', respectively, which are arranged perpendicular to one another. The scales 6, 7 are stationary with respect to the number 3 (on a base stand G) and are arranged in alignment with the coordinate directions X and Y, respectively. The coordinate directions X, Y intersect in point O in the object resting on the object support 1. Above this point O is fixed an arrangement for the observation of the object. This arrangement may, for instance, consist of a focusing microscope 8, the optical axis Z of which passes through the point of intersection O. For the scale reading are employed two solid index lines or wires 9, 9' which are secured with their ends to the object support 1 by means of pairs of rod-shaped carriers 10, 10' and 11, 11', respectively, and are slidably movable over the fixed scales 6, 7. Similarly to the scales 6, 7, the focusing microscope 8 is mounted fixedly with respect to the base stand G.

Figure 3:
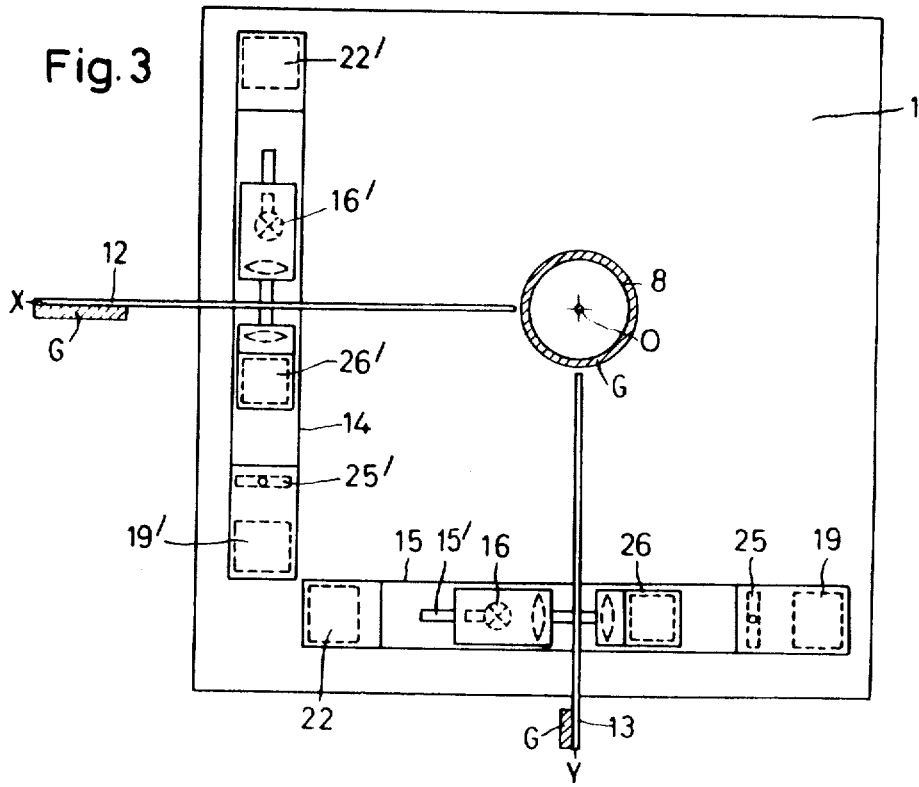
FIG. 3 illustrates in a plan view another embodiment comprising optical scale-detecting means.
Figure 4:
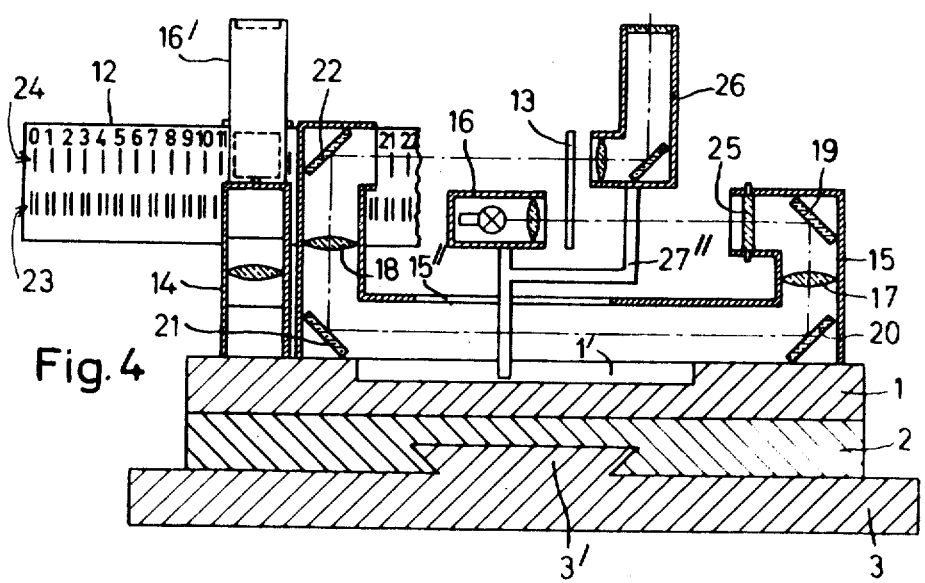
FIG. 4 is a side elevation view of the embodiment illustrated in FIG. 3.

In a further modification of the invention, instead of using the solid index lines or wires 9, 9' (FIG. 2), optical axes may be used as reference lines (scale-reading means) in accordance with the known principle of the optical rule, as it is disclosed, for instance, by Bernard Cuny in the periodical "Microtecnic," Volume 4, July–Aug. 1950, page 194 to 199. An embodiment of this type is illustrated in FIGS. 3 and 4, wherein the parts taken over from the arrangement according to FIG. 2, are provided with the same reference numerals. The point of observation, which in the case of a machine tool is the stationary point of working and which is stationary with respect to the scales 12, 13, is again positioned at O. The two reading devices 14 and 15 are fixedly connected to the slidable object support 1. The design of these reading devices becomes apparent from FIG. 4. The scale 13 is illuminated by an illuminating device 16 and by means of afocal lens system 17, 18, which has a magnification of −1, an image thereof is formed back onto itself and laterally offset, respectively, via the mirrors 19, 20, 21 and 22. The measured value is obtained from the position of the scale line relative to the image of the line. Expediently, the scale, as can be seen at 12, has a row of double lines 23 and a row of single lines 24 such that the double lines 23 and a row of single lines 24 such that the double lines 23 and the single lines 24 are imaged. Upon displacement relative to the scale the images of the double lines proceed in an opposite direction to the displacement of the single lines. In order to be able to interpolate intermediate values, it is advisable to have an optical interpolator such as, for instance a measurably tiltable plane parallel plate 25 connected between the scale 13 and the first element 17 of the optical image-forming system (or between the last element 18 of the image-forming system and the scale image). A microscope or a projector device 26 may be used for the magnified observation of the measured value adjustment. The illuminating device 16 and the projection device 26 are commonly guided, for instance via the support 27'', by the guide slots 15'' and 1' (FIG. 4) so that the same follow the movement of the object support 1 along the scale 13 but remain stationary when movement is perpendicular thereto (in the $x$-direction.) The reading device 14 for the scale 12 is of identical design. The reference numerals of the corresponding parts are, however, provided with a prime.

Instead of locating the axis of the object-detecting means at the point of intersection of two scales, the observation may also be placed—as shown in FIG. 5—at the point of intersection of the intermediate planes of two pairs of scales, each pair constituting a unidimensional scale system. Here, too, identical parts are provided with the same reference numerals. The point of observation O on the axis of the object-detecting means is disposed in the center between the pairs of scales 27, 27' and 28, 28'. The test object (not shown) is fixedly mounted on the object support 1. The support 1 carries two afocal lens systems 29, 30 and 31, 32, respectively, having the magnification −1, in a manner such that an image of the scale 27 is formed onto the scale 27' and an image of the scale 28 is formed onto the scale 28'. The scales 27 and 28 are suitably provided with single indicating lines and the scales 27' and 28' with double indicating lines. For capturing the single scale lines between the double indicating lines, again two optical interpolation systems such as, for instance, the two plane parallel plates 33 and 34, are provided. The microscopes 35 and 36 are used for the observation of the symmetrical interpolation.

FIG. 6 is a sectional view of FIG. 5. Such an arrangement is still subject to the influence of a guiding error if the point O is disposed above (as shown) or below the optical axis 37. This guiding error is to be dealt with in the same manner as the guiding error in a unidimensional measurement and may, for instance, be avoided, as is shown in FIG. 7, in that the point O is placed onto the straight line connecting the points of intersection of the optical axes with the scales.

In addition, other methods which have become known for eliminating the influence of guiding errors may be employed.

It is to be understood that the invention is not limited to the illustrated embodiments, but that modifications may be made therein without departing from the spirit and scope of the invention.

Thus, for instance, the scales may also be designed as grating scales, and scale detection may also be effected via photoelectric capturing devices and pulse counters.

Moreover, the aforedescribed arrangements may also be used for the adjustment of a workpiece in a machine tool, wherein a stationary tool takes the place of the focusing microscope 8.

What I claim is:

1. An arrangement for measuring and adjusting two-dimensional position coordinates comprising a base means, two unidimensional scale systems, a slidable object support slidable relatively to said scale systems, and devices for object and scale detection, said scale-detecting devices being fixedly connected with said slidable object support and the axis of said object-detecting device passing through the point of intersection of said scale systems, said base means maintaining said coordinate scale systems and the axis of said object-detecting device in their mutual relation and supporting the object support in its relatively slidable relation.

2. An arrangement according to claim 1, said scale detection devices comprising a mechanical index slidable across said scale systems.

3. An arrangement according to claim 1, said scale systems comprising scales having a row of single lines and a row of double lines which are imaged together.

4. An arrangement according to claim 1, said scale systems comprising two pairs of scales, of which one each is imaged onto the other one, and object detection is affected at the point of intersection of the intermediate line between the scales of one of said pairs and the intermediate line between the scales of the other of said pairs.

5. An arrangement according to claim 1, said scale detecting devices comprising afocal optical systems, and including beam deflecting means having a measurable optical tilt arranged in the imaging paths of the rays of said scale systems.

6. An arrangement according to claim 1, said scale-detecting devices comprising afocal optical systems having the magnification −1.